(12) United States Patent
Beckman et al.

(10) Patent No.: US 6,256,264 B1
(45) Date of Patent: Jul. 3, 2001

(54) LOCALIZATION OF A SUBMERGED TOW VEHICLE (LOST)

(75) Inventors: Richard R. Beckman, New Orleans; Brian S. Bourgeois, Slidell; Andrew B. Martinez, New Orleans, all of LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/599,868

(22) Filed: Jun. 23, 2000

(51) Int. Cl.[7] .................................................. G01S 15/06
(52) U.S. Cl. ......................... 367/130; 367/124; 367/131
(58) Field of Search ........................... 367/106, 99, 124, 367/130, 131, 19

(56) References Cited

U.S. PATENT DOCUMENTS

| 3,860,900 | * | 1/1975 | Scudder | 367/106 |
| 4,559,621 | * | 12/1985 | Delignieres | 367/130 |
| 4,635,236 | * | 1/1987 | Roberts | 367/130 |
| 4,924,446 | * | 5/1990 | Cyr | 367/130 |
| 5,119,341 | | 6/1992 | Youngberg | 367/5 |
| 6,028,823 | | 2/2000 | Vincent et al. | 367/63 |

OTHER PUBLICATIONS

Beckman; Location of Submerged Towfish (Lost); Master's Thesis; 2000 Tulane University.

* cited by examiner

*Primary Examiner*—Ian J. Lobo
(74) *Attorney, Agent, or Firm*—John J. Karasek; Lawrence G. Legg

(57) ABSTRACT

The location of a submerged tow vehicle (LOST) system provides a device for accurately determining a position of an underwater vehicle towed by a surface craft or aircraft, such as a helicopter. The LOST system utilizes five sources of input data to compute a best estimate of the towed vehicle's position. These are (1) high resolution bathymetry data in an area of the towed vehicle's transit, (2) ocean depth at a position of the towed vehicle, (3) the towed vehicle's velocity over sea bottom, (4) a slant range from the towed vehicle to a known reference point, and (5) a position and course of the towing vehicle. The LOST system is comprised of a slant range updater, a maximum likelihood estimator, a constrained adaptive tracker and a slant range corrector.

30 Claims, 4 Drawing Sheets

LOCALIZATION OF A SUBMERGED TOW VEHICLE (LOST)

BACKGROUND OF THE INVENTION

1. Field of the Invention

This invention pertains generally to a device for accurate estimation of an underwater towed vehicle's position, and more particularly to the making of an estimate of an underwater towed vehicle's position independent of off-board sensors and horizontal range from the towing vehicle.

2. Description of the Prior Art

Underwater towed vehicles are in common use for surveying and location of objects in the ocean due to their relatively low operational cost. To be useful however, the position of the towed vehicle must be known so that the data collected by the towed vehicle's sensors may be geo-rectified. Due to currents in the water and the cantilever in the towing cable, a towed vehicle's position relative to the towing vessel is not easily determined. Since the ocean is opaque to high-frequency electromagnetic signals, the global positioning system (GPS) cannot be used for tow vehicle position.

Current methods for determining the position of a towed vehicle include the lay-back model (See, FIG. 1), the long-base line (LBL) (See, FIG. 2), the short base line (SBL) (See, FIG. 3), and the inverted SBL systems. With the lay-back model method the towed vehicle is assumed to be directly behind the towing vehicle and the lay-back (distance from the towing vehicle) is assumed to be a fixed multiple of the tow vehicle's depth. Alternatively, the amount of cable paid out is assumed to be the slant range to the tow vehicle. The latter method does not take into account the cable's cantilever. Neither method takes into account the effects of local currents on the cables' shape and position. The accuracy of these methods will in general not support precise positioning of the towed vehicle.

The LBL method uses a series of acoustic transponders to localize the tow-vehicle by measuring the time delays between the tow-vehicle and the transponders. These transponders may be bottom mounted or located on the surface, such as shown in U.S. Pat. No. 5,119,341. While these systems are very accurate, their deployment is a time consuming and expensive operation. Furthermore, the LBL method requires that the system be redeployed to each operational area.

The SBL method uses time delay and measured arrival angle of an acoustic signal from the tow-vehicle to the towing vehicle to compute position. These systems are fairly accurate but their resolution is range dependent. Typically, in order to achieve sufficient accuracy, a SBL system is deployed over the tow-vehicle, requiring a second surface craft—an obvious economic disadvantage.

With the inverted SBL method, the directional acoustic receiver is mounted on the towed vehicle instead of the towing vehicle. As a consequence the range dependent accuracy of this system is a problem for very deep tows. SBL and inverted SBL systems cannot be readily used in applications with helicopter towed systems.

SUMMARY OF THE INVENTION

The object of this invention is to provide a system and method for accurate determination of an underwater towed vehicle's position.

Another object of the invention is to provide a system with a position accuracy that is not dependent upon the horizontal range of the towed vehicle from its host.

Another object of the invention is to provide a system where no off-board sensors are required and the system needs not be re-deployed in each new operation area.

Another object of the invention is to provide a system that is cheaper than existing systems.

These and other objectives are achieved with a device for localization of a submerged tow vehicle (LOST) that provides a technique for accurately determining the position of an underwater vehicle towed by a surface craft or a helicopter. The LOST system comprises a state updater, a maximum likelihood estimator, a constrained adaptive tracker and a slant range corrector. The state updater generates a prediction of the towed vehicle's position using a previous estimate and the towing vehicle's course and speed (i.e., dead rckoning). The maximum likelihood estimator utilizes the output of the state updater, along with the measured ocean depth at the current position of the towed vehicle and bathymetry data for the area to compute the most likely position of the towed vehicle based on ocean depth. The constrained adaptive tracker constrains the output of the maximum likelihood estimator by applying limits to the towed vehicle's velocity and acceleration. The slant range corrector forces the position estimate from the constrained adaptive tracker to have the proper slant range between the towed vehicle and a known reference point.

DESCRIPTION OF THE PREFERRED EMBODIMENT

Figure 1:
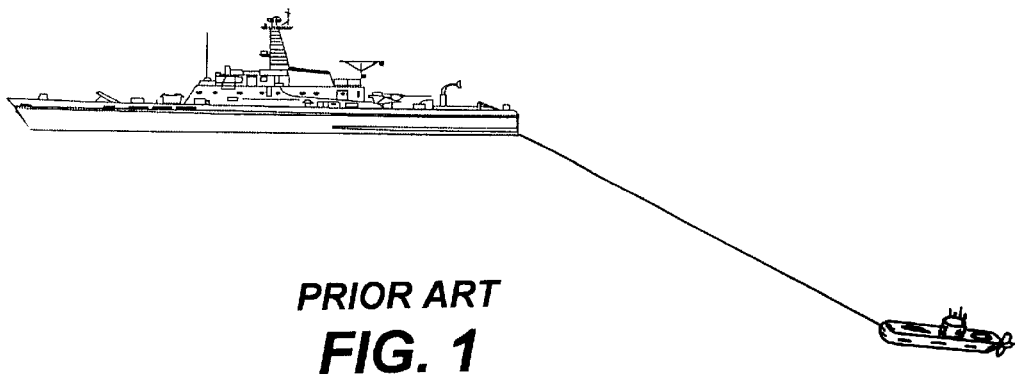
FIG. 1 shows a cable layback method of the prior art.
Figure 2:
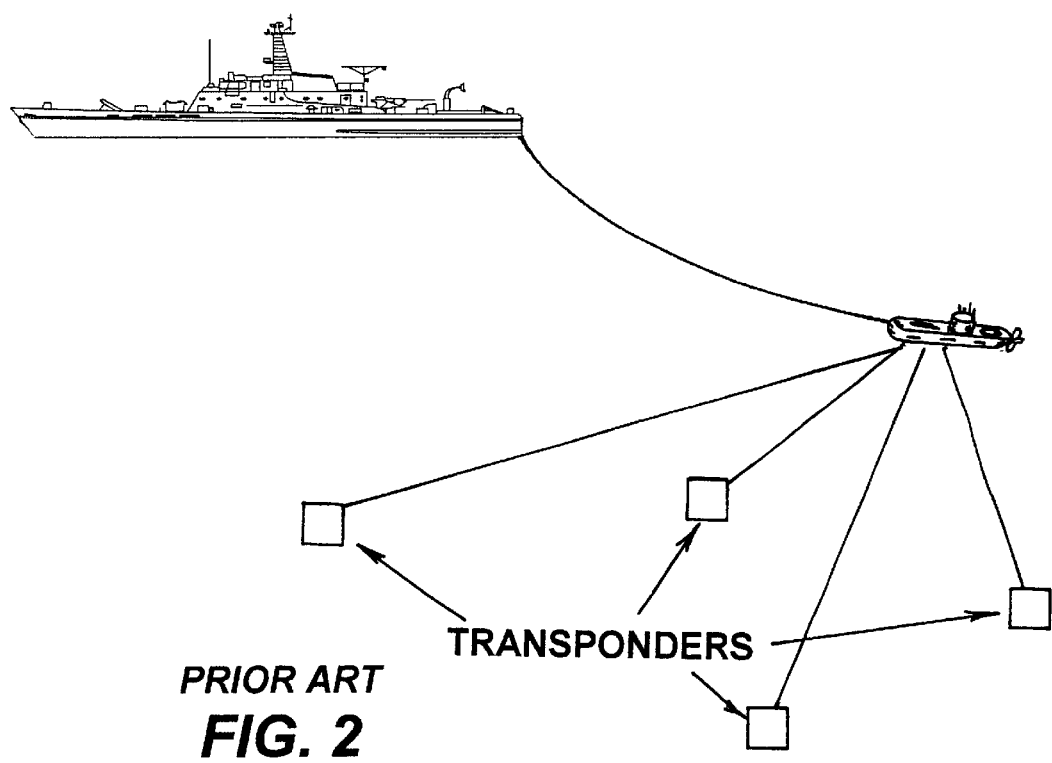
FIG. 2 shows a long baseline approach of the prior art.
Figure 3:
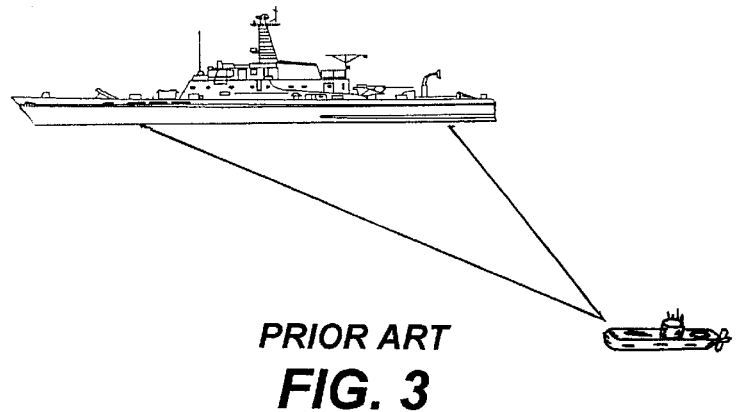
FIG. 3 shows a short baseline approach of the prior art.
Figure 4:
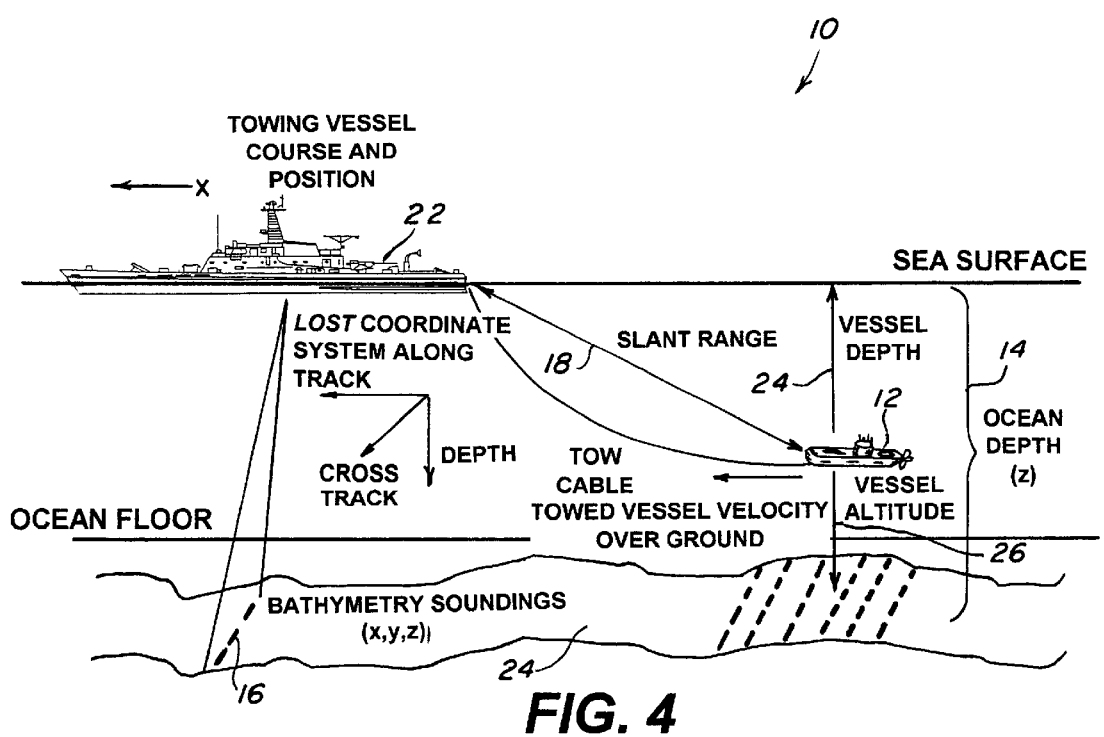
FIG. 4 shows an overview of the implementation of a device for localization of a submerged tow vehicle (LOST) system.

In order to provide an alternative, low-cost, and accurate method to tow vehicle localization, the localization of a submerged tow vehicle (LOST) system 10, as shown in FIG. 4, has been developed for the use in conjunction with certain applications. In applications where high resolution bathymetry data is available, a technique exists for the measurement of ocean depth 14 at the position of the towed vehicle 12, and a technique exists for the measurement of the slant range 18 to a known reference point, then terrain matching provides another means of tow vehicle 12 localization.

The LOST system 10 provides accurate position estimates of towed vehicles 12 towed by either a surface ship 22 or a helicopter (not shown). The primary difference between the two techniques of towing the tow vehicle 12 is in the method that the required data is collected. The system 10 then follows the same implementation once the data has been collected. The LOST system 10 is implemented as a digital system. The LOST system 10 requires several input parameters; these are (1) geo-rectified, high resolution bathymetry 16 for the operational area obtained from a towing vehicle 22 utilizing multibeam swath bathymetry, utilizing past recorded historical data or data recorded after the deployment of the tow vehicle; (2) the depth 24 of the towed vehicle 12 through the use of a pressure sensor or with an uplooking acoustic ranging device; (3) altitude 26 of the towed vehicle 12 over the ocean floor 25 at the position of the towed vehicle 12 which can be measured by an acoustic ranging device, (4) the tow vehicle's 12 velocity over the bottom 25 (both course and speed) utilizing an inertial navigation system (INS), acoustic Doppler velocity log, or an acoustic correlation velocity log; (5) the slant range 18 between the towed vehicle 12 and a known reference point with an acoustic ranging device mounted on the towing vehicle or another vehicle, also an acoustic ranging device mounted on a buoy or some bottom mounted system whose position is known, as shown in U.S. Pat. No. 6,028,823, may be used; and (6) the position and velocity of the towing vehicle 22 obtained from a global positioning system (GPS) satellite system or other navigation system. The LOST system's 10 output is the estimated geo-referenced position of the towed vehicle 12.

Figure 5A:
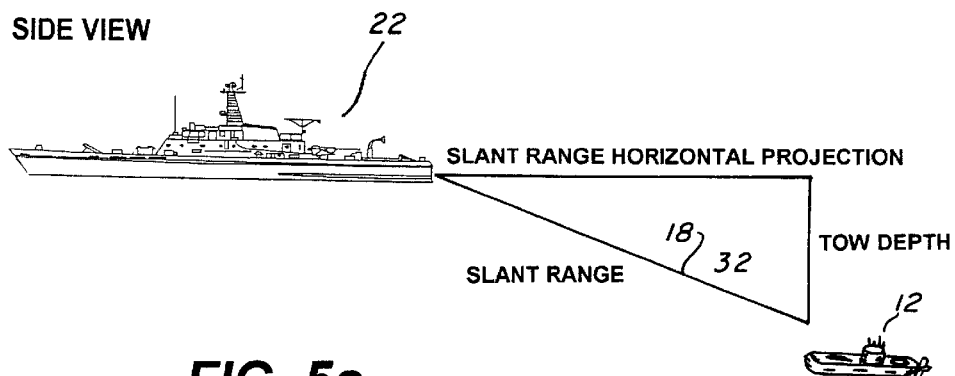
FIG. 5*a* shows a side view of the LOST system.
Figure 5B:
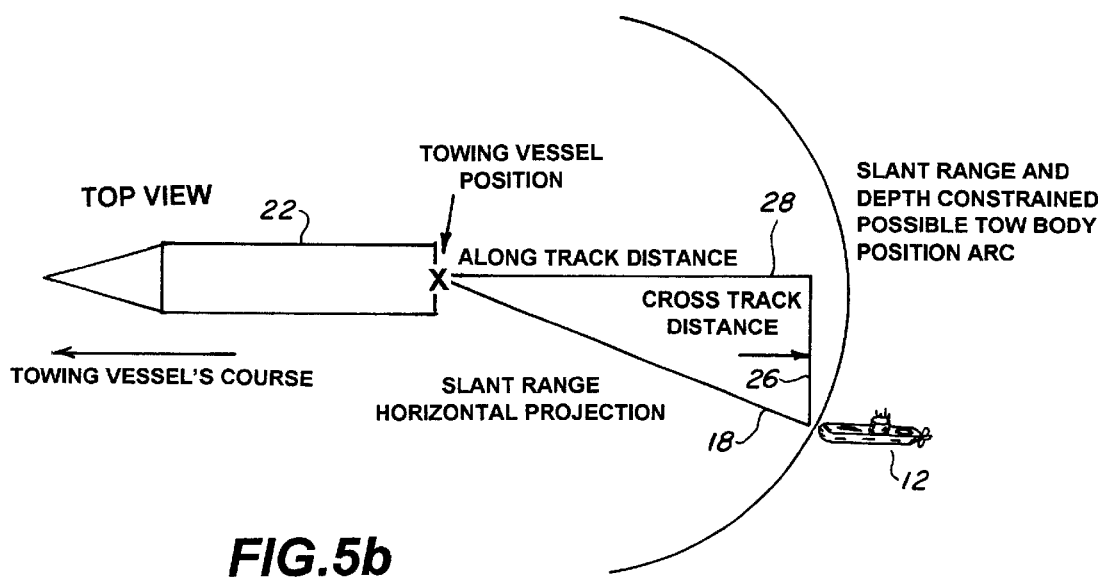
FIG. 5*b* shows a top view of the LOST system.

The outputs and inputs to the LOST system 10 for position are typically in the form of (x, y, z) triplets where x is latitude or northings, in meters, y is longitude or eastings, in meters, and z is depth (or altitude) measured in meters. For all calculations, the LOST system 10 uses an internal coordinate system, whose orthogonal axes are shown in FIG. 4, which are composed of cross track 27, as shown in FIG. 5b, along track 28, as shown in FIG. 5b, and depth 32 directions, as shown in FIG. 5a. FIGS. 5a and 5b shows the along track and cross track distances of the towed vehicle 12 with respect to the towing vehicle 22. The along track distance is the projection of the vector between the tow vehicle 12 and the towing vehicle 22 onto the towing vehicle's track 28. The cross track distance 27 is the component of that vector perpendicular to the towing vehicle's track 28. Coordinate transformations are needed throughout the LOST system 10 to transfer between earth coordinates and the LOST 10 coordinate system; the position and course of the towing vehicle 22 are needed for these 15, transformations. Transforming a position between coordinate systems is well known to those skilled in the art.

There are several methods for collecting each of the six inputs needed by the LOST system 10. The first input, high resolution bathymetry, is collected from any system capable of collecting accurate (x, y, z) data points with high spatial density, before, during, or after the deployment of the tow vehicle 12. The ocean depth 14 is typically computed by combining tow vehicle depth 24, which is measured with a pressure sensor or a system such as a depthimeter (See, U.S. patent application Ser. No. 09/399,474, entitled DEPTHIMETER, filed Sep. 20, 1999), and the tow vehicle altitude 26 above the sea floor 25, which can be measured with an acoustic ranging device. The velocity over the ground of the tow vehicle 12 can be measured directly on the towed vehicle 12 using an inertial navigation system (INS), a velocity log (VL), or a combined INS/VL system. Velocity through the water can be also measured and used as an estimate of the towed vehicle's 12 velocity over the bottom 25 however, this does not take into account the effect of currents. If a velocity measurement is not directly available on the towed vehicle 12, the velocity of the towing vehicle 22 can be used as the estimate. The slant range 18 between the tow vehicle 12 and a known reference point can be obtained with an acoustic ranging device. The known reference point may be the towing vehicle 22, in the case of a surface ship, but it may also be a buoy or a bottom mounted transponder system. The slant range 18 can also be obtained, albeit less accurately, using a cable lay-back model. A cable lay-back model typically uses a rule-of-thumb to determine how far the tow vehicle 12 is behind the towing vehicle 22 based on the length of cable deployed and/or the depth of the tow vehicle 12.

Figure 6:
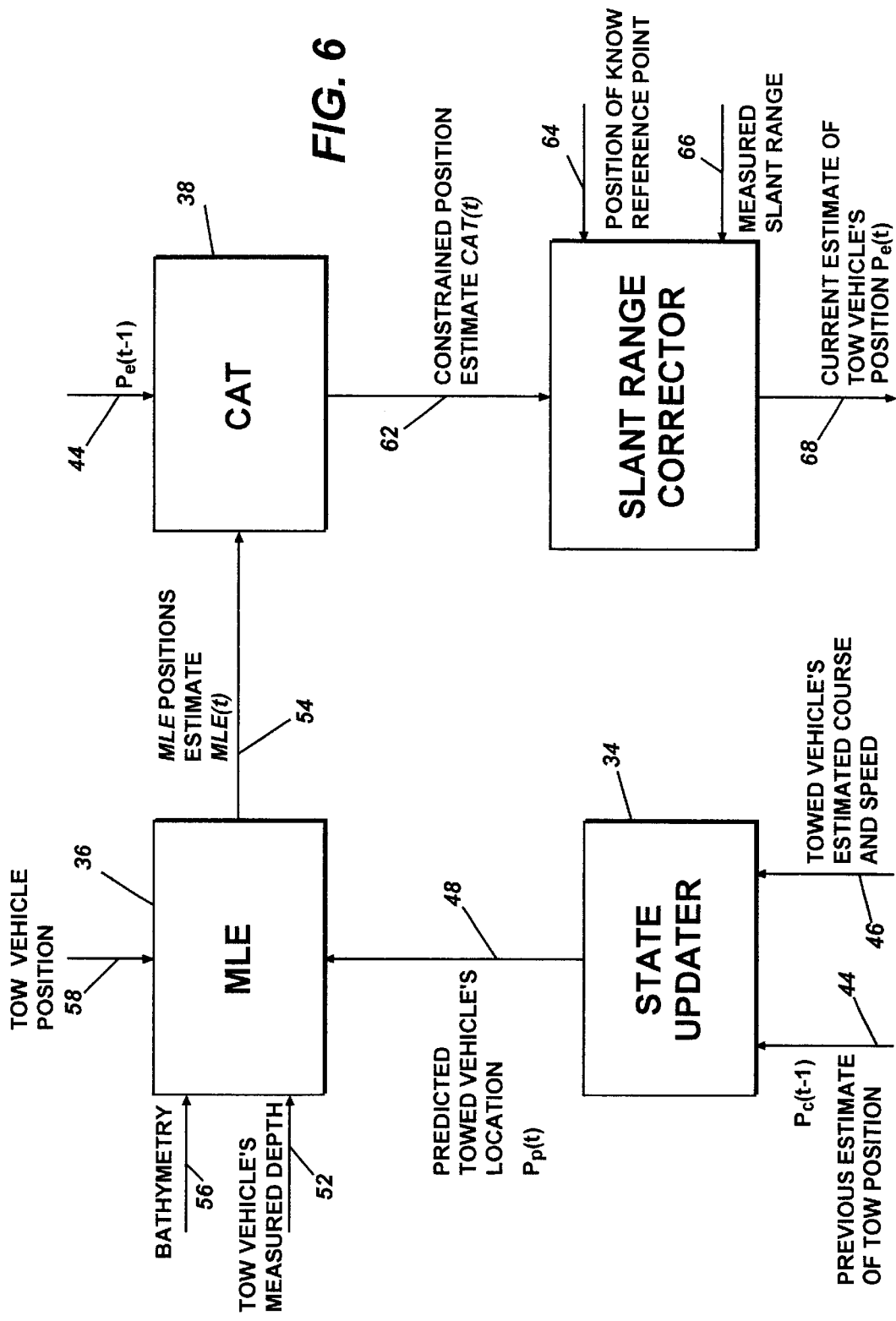
FIG. 6 shows a block diagram of the LOST system.

The LOST system 10, as shown in FIG. 6, is composed of four modules. These are the state updater (SU) 34, a maximum likelihood estimator (MLE) 36, a constrained adaptive tracker (CAT) 38, and a slant range corrector (SRC) 42.

The state updater 34 takes as input the previous best estimate of the tow vehicle position 44 (either from the LOST system 10 or from an initialization routine) and the tow vehicle's velocity 46 and outputs a predicted position 48 at time t, $P_p(t)$, for the tow vehicle 12 based on this information. The state updater 34 predicts the tow vehicle's position 48 based on the previous estimate of its position 44 and an estimate of its velocity over the sea floor 46. The prediction, $P_p(t)$ 48, is calculated by projecting the previous position estimate 44 forward using the tow vehicle's estimated velocity 46. This is shown by the equation:

$$P_p(t)=P_e(t-1)+vt \qquad (1)$$

where:

$P_p(t)$ is the predicted position at time t $P_e(t-1)$ is the position estimate output of the LOST system at time t−1 v is the tow vehicle's estimated velocity

The SU 34 has the effect of changing the along the track component of the tow vehicle's 12 estimated position from the previous estimate but leaves the cross track component of the position unchanged, when the towing vehicle's velocity is used as the tow vehicle's velocity 44. For system initalization, $P_e(t-1)$ 44 must be given an initial seed value. This initial seed value may be obtained numerous ways, but essentially amounts to providing the best estimate of the tow vehicle's position 44. Referring again to FIG. 5b, for example, a cable lay-back model can be used to estimate the along track distance 28 of the tow vehicle 12 and the cross track distance 27 can be assumed to be zero.

The maximum likelihood estimator (MLE) 36 takes as input the towed vehicle's ocean depth measurements 52 measured at the tow vehicle's actual position, the bathymetry 56 and $P_p(t)$ 48 and outputs the MLE's estimate of position, MLE(t) 54.

The MLE 36 computes a maximum likelihood estimate of tow vehicle position 54 using a point-matching algorithm. The algorithm utilizes an input of the bathymetry data 56 and the towed vehicle's measured ocean depth 52 and evaluates the likelihood function, $\lambda(x, y, z)$, at the tow vehicle predicted position 48 and each of the (x, y, z) bathymetry 56 points within the MLE 36 search area. The MLE 36 search area is a region that is expected to include the actual position of the tow vehicle and is centered at the predicted position 48, $P_p(t)$. The size of the search area is a trade-off between convergence speed and computational cost. A large area allows faster convergence since it is more likely that the tow vehicle will be located within that area, but it requires more time to compute the likelihood function's values.

The likelihood, $\lambda(x, y, z)$, is the probability that the ocean depth 52 measured at the actual position of the tow vehicle corresponds to a particular (x, y, z) bathymetry point. In the design of this algorithm, it is assumed that the position errors in (x, y, z) are jointly Gaussian, and that the error in x and y are similar. This yields a likelihood function of the form $$\lambda(x, y, z)=((\Delta x)^2+(\Delta y)^2)/2(\sigma_x)^2+(\Delta z)^2/2(\sigma_z)^2 \qquad (2)$$

where:

σ is the standard deviation of Gaussian model, and $\sigma_x$, $\sigma_y$ and $\sigma_z$ are the standard deviations in the x, y, and z directions respectively. As mentioned above, it is assumed that the errors in the x an y coordinates are similar, so $\sigma_x = \sigma_y$.

$\Delta x$ is the predicted tow vehicle x position minus the bathymetry x position $\Delta y$ is the predicted tow vehicle y position minus the bathymetry y position $\Delta z$ is the ocean depth (z) measured at the position of the tow vehicle minus the depth value for the current bathymetry (x, y, z) data point being considered.

For ease of calculation Eq. (2) can be rewritten as $$\lambda(x, y, z) = ((\Delta x)^2 + (\Delta y)^2) + k(\Delta z)^2 \quad (3)$$

where k is defined as the ratio $\sigma_x/\sigma_z$. The effect of k is to scale $\Delta z$, which in turn determines to what extent the depth measurement, versus the tow vehicle's predicted position, influences the likelihood of the position being considered. The proper value for this ratio is dependent on the character of the terrain over which the LOST system 10, as shown in FIG. 4, is operating as well as the accuracies of the systems being used to collect the various measurements. In general, larger values of k are used for rough terrain, and smaller values are used when data inaccuracies are suspected. A nominal value for k is in the range of 100–1000.

The minimum value of $\lambda(x, y, z)$ corresponds to the most likely (x, y, z) position of the tow vehicle 12. Computing the minimum of a function is well known to those skilled in the art. The resulting minimum is called MLE(t) 54, as shown in FIG. 6, and is passed to the constrained adaptive tracker (CAT) 38 system. The MLE 36 updates both the cross track and the along track estimates of tow vehicle 12 position.

The constrained adaptive tracker (CAT) 38 takes as input $P_e(t-1)$ 44 and MLE(t) 54 and outputs CAT(t) 62. The CAT 38 constrains MLE(t) 54 by forcing the cross track component of the tow vehicle's estimated position 44 to behave in a realistic manner. It does this by applying nonlinear constraints on both the velocity and the acceleration of the cross track component of the tow vehicle's estimated position 44. This is accomplished by using difference equations and applying a threshold to the first and second derivatives of the tow vehicle's position 44. The difference equations used are:

$$e = f_{ct}(MLE(t)) - f_{ct}(P_e(t-1)) \quad (4)$$

$$d(t) = f_a(2ue) \quad (5)$$

$$w(t) = f_v((1-u)w(t-1) + d\Delta t) \quad (6)$$

$$\text{cross}(t) = f_{ct}(P_e(t-1) + w(t)\Delta t) \quad (7)$$

where:

e is the difference between the predicted and MLE cross track positions $f_{ct}(\ )$ is a function that computes the cross track position given an (x, y) position d(t) is the estimated tow vehicle's cross track acceleration at time t $f_a(\ )$ is a function that thresholds the acceleration; the threshold value is set according to the dynamics of the tow vehicle.

u is an adaptive constant; a nominal value for u is 0.001–0.01 w(t) is the estimated tow vehicle's cross track velocity at time t $f_v(\ )$ is a function that thresholds the velocity; the threshold value is set according to the dynamics of the tow vehicle cross(t) is the estimated cross track position at time t $\Delta t$ is the amount of time between system updates.

Computing cross track component for a defined coordinate system, given a point referenced to a different coordinate system is well known to those skilled in the art. (function $f_{ct}$ above). Thresholding a value is well known to those skilled in the art (function $f_a$ and function $f_v$ above). The functions $f_a$ and $f_v$ serve to limit the estimated values of the tow vehicle's velocity and acceleration to reasonable quantities, which prevents the LOST system 10 from generating a new position estimate that is too far from the previous position. The resulting value of cross(t) is the cross track component of the CATs 38 estimated position 62, CAT(t). CAT 38 keeps MLE's 36 estimated along track position as its own estimate of along track position.

The slant range corrector (SRC) 42 takes as input CAT(t) 62, the position of the known reference point 64, and the measured slant range 66 from the tow vehicle 12 to that reference point, and outputs $P_e(t)$ 68, the LOST system's 10 best estimate of the tow vehicle's position. The SRC 42 warps the CAT(t) position estimate 62 forcing it to match the measured slant range 66 between the tow vehicle 12 and a known reference point 64. If the slant range 66 measurement is not available the LOST system's 10 final position estimate is CAT(t) 62. The correction is done by drawing a vector between the known reference point and the CAT(t) 62 position and forcing it to have a length that is equal to the measured slant range 66. This process alters both the along track and cross track components of the estimated position 44. This operation is shown in the following equation:

$$P_e(t) = P_{ref} + (CAT(t) - P_{ref}) R_m / R_a \quad (8)$$

where:

$P_{ref}$ is the position of the known reference point $R_a$ is the range to the reference point using the tow vehicle's estimated position CAT(t)

$R_m$ is the measured slant range between the tow vehicle and the reference point.

Bathymetry data, position and velocity over the sea bottom of the towing vehicle, ocean depth at the position of the towed vehicle, towed vehicle's velocity over the sea bottom and slant range from a known reference point to the towed vehicle may be stored in the memory or memory devices of a computer. The computer is also utilized to analytically determine the towed vehicle's position using the bathymetry data, position and velocity over the sea bottom of the towing vehicle, ocean depth at the position of the towed vehicle, the towed vehicle's velocity over the sea bottom, and slant range from a known reference point; as well as displaying and storing the computed towed vehicles position. The analytically determined information may be displayed on either a video monitor or a printing device.

Although the invention has been described in relation to the exemplary embodiment thereof, it is well understood by those skilled in the art that other variations and modifications can be affected on the preferred embodiment without detracting from the scope and spirit of the invention as set forth in the claims.

What is claimed is:

1. A system, for accurate determination of an underwater towed vehicles' position independent of off-board sensors and horizontal range from the towing vehicle comprised of:

a state updater for predicting the towed vehicle's position, $P_p(t)$, based on a past estimate of the towed vehicle's position, $P_e(t-1)$ and an estimate of its velocity over the sea bottom;

a maximum likelihood estimator, (MLE(t), to estimate the towed vehicle's position utilizing ocean depth at the towed vehicle's position, the bathymetry data, and the towed vehicle's predicted position based on a past estimate of the towed vehicle's position and an estimate of its velocity over the sea bottom, $P_p(t)$;

a constrained adaptive tracker that takes the previous estimate of the towed vehicle's position, $P_e(t-1)$, and the maximum likelihood estimator's estimate of the towed vehicle's position, MLE(t), and computes a constrained adaptive tracker position at time (t), CAT (t); and a slant range corrector that utilizes the constrained adaptive tracker position, CAT(t), at time (t), apposition of a known reference point, and a measured slant range from the towed vehicle to that reference point and computes a final estimate of the towed vehicle's position, $P_e(t)$.

2. A system, for accurate determination of an underwater towed vehicles' position independent of off-board sensors and horizontal range from the towing vehicle comprised of:

means to tow a submerged towed vehicle;

means for obtaining bathymetry data with high spatial density resolution in a survey area;

means for measuring position and velocity over a sea bottom of the towing vehicle;

means for measuring the ocean depth at the position of the towed vehicle;

means for measuring the towed vehicle's velocity over the sea bottom;

means for measuring slant range from a known reference point to the towed vehicle;

means for storing bathymetry data, position and velocity over the sea bottom of the towing vehicle, ocean depth at the position of the towed vehicle, towed vehicle's velocity over the sea bottom, and slant range from a known reference point to the towed vehicle;

means for analytically determining the towed vehicle's position using bathymetry, position and velocity over the sea bottom of the towing vehicle, ocean depth at the position of the towed vehicle, towed vehicle velocity over the sea bottom, and slant range from a known reference point to the towed vehicle; and means for displaying and storing the computed towed vehicle's position.

3. A system, as in claim 2, wherein the means for towing a submerged towed vehicle is a surface vessel.

4. A system, as in claim 2, wherein the means for towing a submerged towed vehicle is an airborne vehicle.

5. A system, as in claim 2, wherein the means for obtaining bathymetry data with high spatial density resolution in a survey area is a towing vehicle with a multibeam swath bathymetry system.

6. A system, as in claim 2, wherein the means for obtaining bathymetry data with high spatial density resolution in a survey area is collection of past recorded historical data in the survey area.

7. A system, as in claim 2, wherein the means for obtaining bathymetry data with high spatial density resolution in a survey area is data in the survey area recorded in the future.

8. A system, as in claim 2, wherein the means for measuring position and velocity over a sea bottom of the towing vehicle is a global satellite positioning system.

9. A system, as in claim 2, wherein the means for measuring the ocean depth at the position of the towed vehicle further comprises:

means for measuring depth of the towed vehicle relative to sea level;

means for measuring an altitude of the towed vehicle above the sea bottom; and means for adding the depth and altitude measurements to produce an ocean depth at the position of the towed vehicle.

10. A system, as in claim 9, wherein the means for measuring depth of the towed vehicle relative to sea level is a pressure sensor.

11. A system, as in claim 9, wherein the means for measuring depth of the towed vehicle relative to sea level is an uplooking acoustic ranging device.

12. A system, as in claim 11, wherein the uplooking acoustic ranging device is a depthimeter.

13. A system, as in claim 9, wherein the means for measuring an altitude of the towed vehicle above the sea bottom is an acoustic ranging device.

14. A system, as in claim 9, wherein the means for adding the depth and altitude measurements to produce an ocean depth at the position of the towed vehicle is a computer.

15. A system, as in claim 2, wherein means for measuring the towed vehicle's velocity over the sea bottom is assuming that said velocity is equal to the towing vehicle's velocity over the sea bottom.

16. A system, as in claim 2, wherein the means for measuring the towed vehicle's velocity over the sea bottom is an inertial navigation system.

17. A system, as in claim 2, wherein the means for measuring the towed vehicle's velocity over the sea bottom is a velocity Doppler acoustic log.

18. A system, as in claim 2, wherein the means for measuring the towed vehicle's velocity over the sea bottom is an acoustic correlation velocity log.

19. A system, as in claim 2, wherein the means for measuring slant range from a known reference point to the towed vehicle is an acoustic ranging device mounted on the towing vehicle.

20. A system, as in claim 2, wherein the means for measuring slant range from a known reference point to the towed vehicle is an acoustic ranging device mounted on a surface vehicle other than the towing vehicle.

21. A system, as in claim 2, wherein the means for measuring slant range from a known reference point to the towed vehicle is an acoustic ranging device mounted on a buoy whose position is known.

22. A system, as in claim 2, wherein the means for measuring slant range from a known reference point to the towed vehicle is an acoustic ranging device mounted on a bottom mounted system whose position is known.

23. A system, as in claim 2, wherein the means for storing bathymetry data, position and velocity over the sea bottom of the towing vehicle, ocean depth at the position of the towed vehicle, towed vehicle's velocity over the sea bottom, and slant range from a known reference point to the towed vehicle is a computer.

24. A system, as in claim 2, wherein the means for analytically determining the towed vehicle's position using bathymetry, position and velocity over the sea bottom of the towing vehicle, ocean depth at the position of the towed vehicle, towed vehicle velocity over the sea bottom, and slant range from a known reference point to the towed vehicle is a computer.

25. A system, as in claim 2, wherein the means for displaying and storing the computed towed vehicles position is a computer.

26. A system, as in claim 2, wherein the means for displaying and storing the computed towed vehicles position is a printing device.

27. A computer system for analytic determination of a towed vehicles position using bathymetry data, position and velocity over the sea bottom of a towing vehicle, ocean depth at a position of the towed vehicle, a towed vehicle's velocity over the sea bottom, and slant range from a known reference point to the towed vehicle comprised of:

a computer for computing
  (a) a predicted tow position, $P_p(t)$, using a state updater utilizing $P_e(t-1)$ and the towed vehicle's velocity over the sea bottom at a time (t);
  (b) a maximum likelihood estimate (MLE) position at time (t), MLE(t), using bathymetry data, a measurement of ocean depth at a towed vehicle's position, and the towed vehicle's predicted position at time (t), $P_p(t)$;
  (c) a constrained position estimate at time (t), CAT(t), using a constrained adaptive tracking (CAT) algorithm utilizing MLE(t), and a previous estimated location of the towed vehicle at time (t-1), $P_e(t-1)$; and
  (d) a current position estimate at time (t), $P_e(t)$, using a slant range corrector utilizing CAT(t) and a measured slant range from a known reference point to the towed vehicle.

28. A method for accurate determination of an underwater towed vehicle's position independent of off-board sensors and horizontal range from a towing vehicle comprising:

step of towing a submerged tow vehicle;

step of obtaining bathymetry with high spatial density resolution in a survey area;

step of measuring position and velocity over a sea bottom traversed of the towing vehicle;

step of measuring ocean depth at a towed vehicle's position;

step of measuring a towed vehicle's velocity over the sea bottom:

step of measuring a slant range from the towed vehicle to a known reference point;

step of storing bathymetry data, position, and velocity of the towing vehicle over the sea bottom, ocean depth at a position of the towed vehicle, the towed vehicle's velocity over the sea bottom, and slant range from the known reference point to the towed vehicle;

step of analytically determining the towed vehicle's position using bathymetry data, position, and velocity of the towing vehicle over the sea bottom, ocean depth at the position of the towed vehicle, towed vehicle's velocity over the sea bottom, and slant range from the known reference point to the towed vehicle; and step of displaying and storing the analytically determined towed vehicle's position.

29. A method for accurate determination of an underwater towed vehicle's position independent of off-board sensors and horizontal range from a towing vehicle comprising:

step of towing a submerged tow vehicle;

step of obtaining bathymetry with high spatial density resolution in a survey area;

step of measuring position and velocity over a sea bottom traversed of towing vehicle;

step of measuring ocean depth at a towed vehicle's position;

step of estimating a towed vehicle's velocity over the sea bottom:

step of measuring a slant range from the towed vehicle to a known reference point;

step of storing bathymetry data, position, and velocity the towing vehicle over the sea bottom, ocean depth at a position of the towed vehicle, the towed vehicle's velocity over the sea bottom, and slant range from the known reference point to the towed vehicle;

step of analytically determining the towed vehicle's position using bathymetry data, position, and velocity of the towing vehicle over the sea bottom, ocean depth at the position of the towed vehicle, towed vehicle's velocity over the sea bottom, and slant range from the known reference point to the towed vehicle; and step of displaying and storing the analytically determined towed vehicle's position.

30. A method for analytic determination of a towed vehicle's position using bathymetry data, position and velocity over the sea bottom of a towing vehicle, ocean depth at a position of the towed vehicle, a towed vehicle's velocity over the sea bottom, and slant range from a known reference point to the towed vehicle comprised of:

step of predicting a position, $P_p(t)$, using a state updater which utilizes $P_e(t-1)$ and the towed vehicle's velocity over the sea bottom at time (t);

step of determining the maximum likelihood estimated position at time (t), MLE(t), using bathymetry data, measured ocean depth at a position of the towed vehicle and towed vehicle's predicted position at time (t), $P_p(t)$;

step of determining constrained position estimate at time (t), CAT(t), using a constrained adaptive tracking algorithm which utilizes MLE(t), and a previous estimated location of the towed vehicle at time (t-1), $P_e(t-1)$; and step of determining a current position estimate at time (t), $P_e(t)$, using a slant range corrector which utilizes CAT(t) and a measured slant range from a known reference point to the towed vehicle.

* * * * *